(12) United States Patent
Laastad

(10) Patent No.: US 10,947,834 B2
(45) Date of Patent: Mar. 16, 2021

(54) SENSOR FOR A DOWNHOLE TOOL

(71) Applicant: EQUINOR ENERGY AS, Stavanger (NO)

(72) Inventor: Harald Odd Laastad, Rådal (NO)

(73) Assignee: EQUINOR ENERGY AS, Stavanger (NO)

( * ) Notice: Subject to any disclaimer, the term of this patent is extended or adjusted under 35 U.S.C. 154(b) by 0 days.

(21) Appl. No.: 16/465,603

(22) PCT Filed: Nov. 30, 2017

(86) PCT No.: PCT/PC2017/050312
§ 371 (c)(1),
(2) Date: May 31, 2019

(87) PCT Pub. No.: WO2018/101842
PCT Pub. Date: Jun. 7, 2018

(65) Prior Publication Data
US 2019/0383132 A1  Dec. 19, 2019

(30) Foreign Application Priority Data

Dec. 2, 2016 (GB) ..................................... 1620514

(51) Int. Cl.
*E21B 47/01* (2012.01)
*G01V 11/00* (2006.01)
(Continued)

(52) U.S. Cl.
CPC .............. *E21B 47/01* (2013.01); *E21B 47/04* (2013.01); *E21B 47/09* (2013.01); *G01V 11/002* (2013.01); *E21B 47/26* (2020.05)

(58) Field of Classification Search
CPC .......... E21B 47/00; E21B 47/01; E21B 47/04; E21B 47/09
See application file for complete search history.

(56) References Cited

U.S. PATENT DOCUMENTS

| 3,205,356 A | 9/1965 | Owen |
| 4,396,838 A | 8/1983 | Wolcott, Jr. |

(Continued)

FOREIGN PATENT DOCUMENTS

| CN | 105089611 | 11/2015 |
| EP | 0 713 104 | 5/1996 |

(Continued)

OTHER PUBLICATIONS

International Search Report and Written Opinion of the International Searching Authority dated Feb. 9, 2018 in International (PCT) Application No. PCT/NO2017/050312.

(Continued)

*Primary Examiner* — Tara Schimpf
(74) *Attorney, Agent, or Firm* — Wenderoth, Lind & Ponack, L.L.P.

(57) ABSTRACT

A sensor apparatus for a downhole tool 12 comprises a sensor 24 for taking downhole measurements; and a sensor support 26, 28 for mounting the sensor 24 to the downhole tool 12. The sensor support 26, 28 includes an actuator 26 for moving at least a part of the sensor 24 in a direction extending along a longitudinal axis of the downhole tool 12, such that in use the moveable part(s) of the sensor 24 can move relative to the tool 12 in a direction extending along a longitudinal axis of a borehole. The sensor apparatus is arranged to log measurements from the sensor using a point on the tool 12 as a reference to determine relative depth between measurements without using an external reference point to obtain an indication of the absolute depth of the measurements.

20 Claims, 1 Drawing Sheet

(51) Int. Cl.
*E21B 47/09* (2012.01)
*E21B 47/04* (2012.01)
E21B 47/26 (2012.01)

(56) References Cited

U.S. PATENT DOCUMENTS

2004/0114463 A1   6/2004   Berg et al.
2016/0245947 A1*  8/2016   Clay ........................ G01V 3/28

FOREIGN PATENT DOCUMENTS

| EP | 2 045 440    | 4/2009 |
| WO | 2007/080080  | 7/2007 |
| WO | 2011/097110  | 8/2011 |
| WO | 2016/105406  | 6/2016 |
| WO | 2016/133519  | 8/2016 |

OTHER PUBLICATIONS

United Kingdom Search Report dated Jan. 11, 2017 in corresponding GB Application No. 1620514.8.

* cited by examiner

SENSOR FOR A DOWNHOLE TOOL

The present invention relates to a sensor apparatus for a downhole tool, and to a related method for taking downhole measurements.

In the oil and gas industry it is important to be able to make downhole measurements in various situations. For example, for assessment of newly drilled wells, for use after a formation collapse, for plug and abandon, or to assess well integrity and for cement evaluation, amongst other things. In order to obtain such measurements it is well known to use downhole sensors of various types. These can be sensors in downhole tools for attachment to a drill in order to perform logging while drilling (LWD) measurements. Alternatively, the sensor can be in a dedicated wireline tool used mainly for obtaining measurements. There are various types of sensors based on different measurement principles, such as the use of electromagnetic waves of various frequencies including optical and x-ray systems, as well as the use of ultrasound and other sonic type sensors. Some sensors rely on excitation of the tool body and hence excitation of the adjacent downhole structures. Other sensors emit waves that can pass through the tool body, or at least will pass through a suitable window in the tool body. It is also possible for the sensor to be based on receiving waves or other signals from downhole structures with the downhole structures being excited from a remote location.

It is important to take measurements at varying depths in the borehole in order to assess how the downhole conditions vary. For most applications a continuous range of measurement over parts of or whole of the downhole section will be required. In existing technologies the sensor position in the drill string or sensor string is measured relative to a surface reference and/or a reference point in the string. For example, depth measuring systems applied to cables or pipes can give a sensor position relative to a reference level such as the surface or sea level, a platform floor or deck level and so on. This can be translated to a tool bottom or drill bit depth so that the position of the sensor can be determined with respect to a bottom point. The relative position of the sensor in the tool is known based on the particular sensor and/or the particular tool that is being used. This position is fixed so that there is no variation in the sensor position relative to the reference level.

Viewed from a first aspect, the invention provides a sensor apparatus for a downhole tool, the sensor apparatus comprising: a sensor for taking downhole measurements; and a sensor support for mounting the sensor to the downhole tool; wherein the sensor support includes an actuator for moving at least a part of the sensor in a direction extending along a longitudinal axis of the downhole tool, such that in use the moveable part(s) of the sensor can move relative to the tool in a direction extending along a longitudinal axis of a borehole; and wherein the sensor apparatus is arranged to log measurements from the sensor using a point on the tool as a reference to determine relative depth between measurements without using an external reference point to obtain an indication of the absolute depth of the measurements.

With this sensor apparatus at least a part of the sensor is not fixed relative to the tool as in the prior art, but instead it is arranged to move in the borehole along the length of the borehole, which would typically be the vertical height of the borehole. With this arrangement, the sensing reference for the direction along the length of the borehole can advantageously become a point on the tool such as a fixed location on the tool body rather than a reference related to the absolute height/depth of the sensor within the borehole. Optionally, the sensor apparatus may also be arranged for rotational movement of the sensor in order to allow for sensor measurements in varying directions extending from the longitudinal axis of the tool, for example perpendicular to the axis. In this case the sensor may be able to provide measurements about part of or the entire circumference of the borehole by means of the rotational movement.

It has been found with existing technologies that there is a high degree of uncertainty in the position of the sensor for both logging while drilling systems and for wireline tools. For example, there can be an unknown and varying degree of stretching or compression of the cables or pipes that are used, due to sticking and slipping in the borehole, deviations of the borehole and so on. With existing sensors attempts have been made to compensate for movement during sensing via the use of accelerometers and the like, but these are not adequate for addressing uncertainties due to sticking and slipping where the change in depth between one sensing location and another cannot accurately be known.

The inventor has made the realisation that in most cases the absolute depth for the measurements is not as important as the relative depth between local measurements. The proposed sensor apparatus may thus be operated without any reference to absolute depth, and instead may simply provide high resolution measurements with an indication of relative depth at a local level. It is thus not necessary to determine absolute depth with any accuracy. By providing a sensor apparatus with the ability to move the sensor or parts of the sensor along the axis of the tool there is no need to rely on movement of the tool to move the sensor along the borehole, so the uncertainty inherent in movement of the tool is avoided. Instead, sensor readings can be obtained with movement of the sensor, or parts thereof, whilst the tool is stationary. This allows for significant increases in the accuracy of the changes in depth for the different readings, at a local level.

The resolution of the depth changes can effectively be increased due to the decision to effectively ignore absolute depth. This is an important advantage since sensor technology is continually developing increased resolution, and if this increase in sensor resolution is not matched by an equivalent accuracy in sensor position for different readings then full use cannot be made of the sensor resolution. In addition, where the sensor can also have a rotational movement then the same advantages relating to accurate location of the measurements in relation to one another is available for measurements in different directions about the axis of the borehole using the rotational movement of the sensor, as well as measurements in those different directions at different depth locations. Thus, the sensor may advantageously be able to move through 360 degrees for the full extent of the movement of the sensor along the axis of the borehole, thereby allowing for measurements about a cylindrical volume with the relative locations of the measurements being known to a high degree of accuracy.

The proposed sensor apparatus can hence reduce the uncertainty of computed results for assessment of wells such as for well integrity cement evaluation. The uncertainties for petrophysical evaluation all aspects can be reduced. The sensor apparatus can perform image processing in very high resolution, and it can eliminate and/or control noise. The full scanning potential for specific image techniques can be accessed, including for example azimuthal x-ray scanning. The sensor apparatus can also make use of existing proven logging technology, with the addition of resolution improvements. The delivery from logging time to results time is short, and the improved accuracy/resolution in the measurements can lead to improvements in all aspects of use of downhole measurements, including modelling and so on.

The sensor apparatus is arranged to use the tool body as a sensing reference and to provide an indication of the sensor position relative to a reference point on the tool body. The sensor apparatus may also be used with a measure of absolute depth using approximations as used in the prior art or measurements from other devices, although this is not essential and instead the sensor apparatus can operate without any reference to absolute depth. In some examples there is no reference to absolute depth at all.

In example embodiments the sensor apparatus may use only a single sensor for taking downhole measurements to assess downhole conditions and to log measurements of downhole conditions. In particular, the sensor apparatus may not include or use further sensors to locate the single sensor or to provide an indication of absolute height with reference to points outside of the tool. Thus, the sensor for taking downhole measurements may be the only sensor on the apparatus that is used in the assessment of downhole conditions, and there may be no further sensors that take measurements for the assessment of downhole conditions and/or to find external reference points to provide a measure of absolute depth for the measurements. In this way the sensor apparatus is simplified compared to prior art systems that rely on multiple sensors to provide the dual function of identifying absolute height (for example with reference to a radiation source or other reference point outside of the tool) as well as measuring downhole conditions.

The moveable part(s) of the sensor may for example be one or more transmitting and/or receiving parts of the sensor. In some cases the sensor may take measurements without the use of any transmitting parts and in this case the sensor might have only a receiving part, with the receiving part optionally moving relative to the tool. For example, a geological formation may be excited by an external source of excitation. Where the sensor includes both transmitting and receiving parts then the sensor apparatus may be arranged so that both of the transmitting and receiving parts of the sensor will move at the same time, with both parts being moved by the actuator. In some examples the whole sensor may move relative to the tool. In some cases there will be a single part used for both transmitting and receiving and this type of transducer or transceiver may form the main part of the sensor. However, it will also be appreciated that in some cases only certain parts of the sensor might move, with other parts remaining static. For example, transmitting and receiving parts such as lenses and reflectors may be used to create an effective movement of the sensing location and/or to rotate the sensing direction, whilst other parts of the sensor need not move at all.

The moveable part(s) of the sensor are held on the actuator for movement controlled by the actuator. The range of movement along the longitudinal axis may be at least 1 m in the direction extending along the longitudinal axis, for example at least 1.5 m. In one possible arrangement the range of movement is about 2 m or more. Where the sensor type requires a window then a window may be provided with a size extending across the full extent of movement of transmitting and/or receiving parts of the sensor.

The actuator can be implemented using a mechanism for controlled translating movement of the moveable part(s) of the sensor, and in particular for a translating movement in a straight line. The sensor support may be arranged so that there is a movement of the moveable part(s) of the sensor in a straight line that is parallel with the longitudinal axis of the tool. The actuator may include mechanical, hydraulic, or electro-mechanical parts. In one example the actuator includes a screw shaft with the sensor mounted for sliding movement along the screw shaft whilst rotation of the sensor relative to the screw shaft is restricted. With this arrangement it is possible to make highly accurate sliding movements of the sensor by rotation of the screw shaft. The screw shaft may be rotated by an electric motor, for example. A no-back device may be included so that the sensor cannot move along the screw shaft unless the motor is turning. This can prevent unwanted movements of the sensor due to accelerations and other movements of the tool.

The actuator may additionally be able to rotate the sensor so that the sensor can take measurements in various directions extending outward from the longitudinal axis of the tool. Thus, the actuator may comprise a mechanism for both translating and rotating movement of the moveable part(s) of the sensor. For example, the actuator may comprise a first part of the mechanism for translating movement and a second part of the mechanism for rotating movement. The second part of the mechanism may comprise a turntable or track for enabling movement of the moveable parts of the sensor about the longitudinal axis of the tool to take measurements in various directions extending outward from the longitudinal axis of the tool. The moveable part(s) of the sensor may be mounted on the first or the second part of the mechanism, with that part of the mechanism then being mounted on the other part, for example with the moveable part(s) of the sensor mounted to a rotating mechanism, and the rotating mechanism being mounted to a translation mechanism.

The sensing apparatus may be arranged to determine the movement of the moveable part(s) of the sensor relative to a reference point on the tool and to log this movement along with logging of the measurement data from the sensor in order to log the relative locations of measurements with reference to the tool body. This could be done by reference to the input to the actuator, for example a time that the actuator has been activated and a known speed of movement. Alternatively or additionally the actuator may include a movement detector for monitoring movement of the actuator and/or movement of the moveable part(s) of the sensor propelled by the actuator. For example, where a screw shaft is used the actuator may include a detector for monitoring rotation of the shaft, such as a potentiometer arranged to detect rotations of the shaft.

The sensor support may include fixings for coupling to the downhole tool, for example for coupling with a body of the tool, with the actuator being supported on these fixings and the sensor being supported on the actuator. Alternatively the sensor support may be formed integrally with the tool body, or a part thereof, with the actuator being supported via a suitable mechanical connection to the tool and the sensor again being supported on the actuator.

The sensor and actuator may be arranged so that measurements can be taken whilst the sensor is moving under the control of the actuator. Alternatively or additionally the sensor and actuator may be arranged so that measurements are taken whilst the sensor is stationary, and step-wise movements of the sensor are made between multiple measurements. In both cases the sensor apparatus may be configured to take measurements when the downhole tool is stationary.

The proposed sensor apparatus could be implemented with any suitable sensor. It will be appreciated that there are particular advantages when the sensor is a sensor with a high resolution, and thus in some examples the sensor is of a type that can provide a high resolution, such as a resolution that is commensurate with the accuracy of movement of the moveable part(s) of the sensor by the actuator. In examples where the actuator can move the moveable part(s) of the sensor with at least centimetre or at least millimetre accuracy then the sensor may be a sensor capable of providing measurements with an appropriate level of accuracy, and typically a resolution that is higher than the accuracy of movement by the actuator.

The resolution of the sensor may be in the mm to µm range. The sensor may have a sampling interval of 1-1000 ms. The acquisition speed of the sensor is related to both the resolution and the sampling rate, and this impacts on the accuracy of the sensor readings as the sensor is being moved. A typical high performing sensor might have a resolution of 10-50 µm with a sampling interval of 10-100 ms. The sensor may make use of sonic waves or electromagnetic waves.

Since sensors using electromagnetic waves in the optical range or at higher wavelengths can provide the highest resolution then the sensor may advantageously be a sensor using light or ionising radiation, for example the sensor may be a sensor using x-ray. In one possible implementation the sensor is an x-ray scanner sensor such as an azimuthal x-ray scanning sensor. Another possibility is a NMR sensor for high resolution NMR measurements. In some examples a carbon nanotube (CNT) based field emitter system can be used, for example a CNT sensor system as described in WO 2016/205822.

In some cases such a sensor will require a sensing window in the tool body, such as a reinforced glass window opening through the metal casing of the tool. The sensor apparatus may hence include a sensing window associated with the sensor. The width of the sensing window can be set in a similar fashion to sensing windows used with known sensors, but to allow for the movement of the moveable part(s) of the sensor along the longitudinal axis of the tool then the window should have a longitudinal extent, which may have a length at least as large as the range of movement of the moveable part(s) of the sensor. The window may have a reinforced frame to resist forces that will occur downhole, including pressures as well as forces arising from rotation of the tool and collision with outside objects.

The sensing apparatus may be configured for use whilst the tool is stationary and also whilst the tool is moving. It will be appreciated that in some cases a lower resolution measurement, or a measurement with greater uncertainty in the resolution can be useful, such as a measurement obtained during movement of the tool. Thus the sensor apparatus may be arranged to be used in the same way as prior art sensors, as well as providing the advantages from the features that allow for use to obtain higher resolution measurements with a stationary tool. In a refinement of this, the sensor apparatus may include an accelerometer for monitoring movement of the moveable part(s) of the sensor and/or of the tool, and the sensor apparatus may be arranged to use the accelerometer for correction to improve the results from the sensor in the case of variation in the speed of movement of the tool. The correction may include adjustment to the data measured by the sensor to take account of sensor movement, and/or adjustment to the depth logged as a location for the measurement. The sensor may be moved by the actuator based on the accelerometer measurements as a way to cancel out sticking and slipping or the like.

The downhole sensor is advantageously for use in an oil and gas installation, and hence may be for a downhole tool that is arranged for use in a geological formation associated with an oil and gas installation. In some examples the invention extends to a downhole tool including the sensor apparatus, for example a downhole tool for use in the oil and gas industry. The downhole tool may include a power supply for use with the sensor, for example a wired connection to a source of power, which may be a topside source of power or a downhole power generator such as a mud turbine. The downhole tool may include a data transmission and/or storage device for transmission and/or storage of data obtained via measurements made with the sensor. The downhole tool may include a sensing window as discussed above. In one case the downhole tool is a wireline tool, and in this example the sensor may receive power via a wired connection to a topside power source. Data may be transmitted via the wired connection using a data transmission device on the tool. The data may also be stored. The downhole tool may be a tool for assessment of newly drilled wells, a tool for use after a formation collapse, a tool for measurements relating to plug and abandon, a tool for assessing well integrity, or a tool for cement evaluation. In another example the downhole tool is a sensing tool for logging while drilling. In this example the sensor may receive power from a downhole turbine, and the sensor data may be logged in a data storage device for later analysis.

Viewed from a second aspect, the invention provides a method for taking downhole measurements, the method comprising using a sensor apparatus in a downhole tool, wherein the sensor apparatus is as described above in relation to the first aspect or as described in connection with the optional features relating to the first aspect.

The method may hence include logging measurements from the sensor using a point on the tool as a reference to determine relative depth between measurements without using an external reference point to obtain an indication of the absolute depth of the measurements. The method may use only this sensor for logging measurements of downhole conditions, and thus there may not be any use of other sensors to determine absolute depth, such as by measurements to find the distance from an external reference point. The method may include moving the moveable part(s) of the sensor in a direction extending along a longitudinal axis of the downhole tool, such that the moveable part(s) of the sensor are moved relative to the tool in a direction extending along a vertical axis of a borehole. This movement may be done during taking measurements, either with measurements taken with the moveable part(s) of the sensor stationary and stepwise movement in between multiple measurements, or with continuous movement during on-going measurement with the sensor. The method provides advantages as discussed above in connection with the first aspect and optional features thereof.

The actuator can be implemented using various mechanisms as discussed above and may optionally be arranged for a rotational movement of the sensor as well as the movement extending along the longitudinal axis of the tool, thereby allowing for measurements in various directions extending outward from the longitudinal axis. The method may include using the actuator for controlled translating movement of the moveable part(s) of the sensor, and in particular for a translating movement in a straight line. The method can include detecting the movement of the moveable part(s) of the sensor relative to a reference point on the tool and optionally logging this movement along with logging of the measurement data from the sensor. The method may additionally include using the actuator to rotate the sensor in order to obtain measurements at different directions extending outward from the longitudinal axis, for example measurements obtained through 360 degrees around the axis as well as at different longitudinal positions along the axis.

The downhole tool may be a tool as discussed above. The method may include using the sensor apparatus for assessment of newly drilled wells, after a formation collapse, for measurements relating to plug and abandon, for assessing well integrity, or for cement evaluation. In another example the downhole tool is a sensing tool for logging while drilling and the method comprises logging while drilling.

Viewed from a third aspect, the invention provides a method of manufacturing or modifying a downhole tool, the method comprising installing a sensor apparatus on the downhole tool, the sensor apparatus being as described above in relation to the first aspect or as described in connection with the optional features relating to the first aspect. This method may include removing an existing sensor from a downhole tool and replacing the existing sensor with the sensor apparatus discussed above. Thus, the method may relate to retrofitting of the proposed sensor apparatus to downhole tools of an existing design that were previously fitted with a non-moving sensor.

A preferred embodiment of the invention will now be described by way of example only and with reference to the accompanying Figures, in which.

Figure 1:
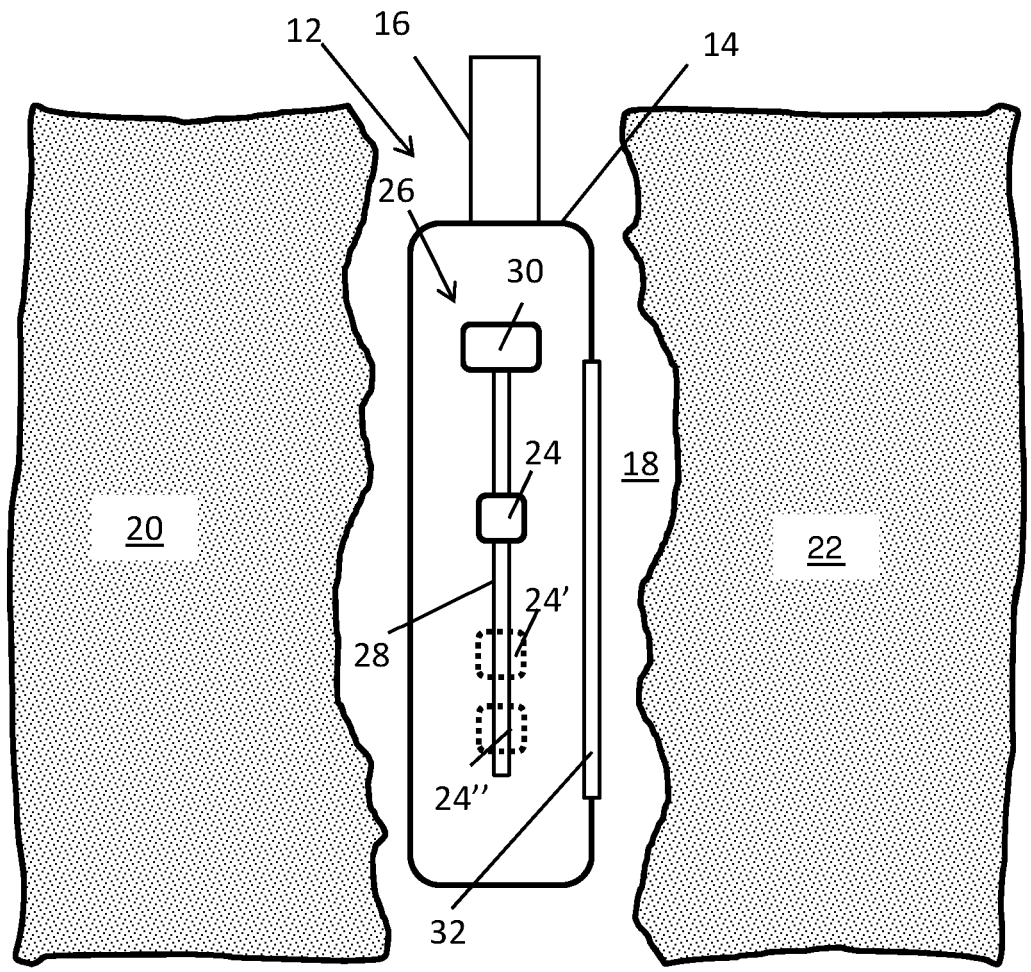
FIG. 1 is a schematic drawing of a downhole tool with a sensor.

As can be seen in FIG. 1, the downhole tool 12 has a tool body 14 and a connection to the surface 16, via a wireline 16 for example. The tool 12 is shown in a borehole 18 surrounded by target objects 20, 22, which may be geological formations. It is required to be able to measure the characteristics of the target objects 20, 22 and for this purpose the downhole tool 12 includes a sensor 24.

The sensor 24 is a part of a sensor apparatus that also includes an actuator 26, with the actuator 26 forming a part of a support for the sensor 24. The actuator 26 can itself be connected to the tool body 14 via other parts of the sensor support. The actuator 26 in this example comprises a screw shaft 28 driven by a motor and potentiometer device 30. The sensor 24 is fitted to the screw shaft via a nut that is permitted to slide but not rotate, such that when the shaft 28 is turned by the motor then the sensor 24 will translate along the direction of the shaft 28. The shaft 28 is aligned with the longitudinal axis of the downhole tool 12, which in use is aligned with the direction of the borehole 18. Typically this would be a vertical direction, although it will be appreciated that the borehole 18 may not be aligned exactly to the vertical. The actuator 26 can move the sensor 24 along the shaft 28 to different positions on the shaft 28, as shown by the dashed sensors 24' and 24". In this way the sensor apparatus allows for a measurement of the target objects 20, 22 along a measurement interval with a depth equivalent to the length of the shaft 28, and with a high degree of accuracy in terms of the change in depth. The sensor 24 may be moved whilst the tool 12 is stationary, which removes the uncertainties that arise when the sensor depth is varied by movement of the tool 12. The shaft 28 might allow for measurements over a 2 m depth interval with millimetre accuracy in terms of the location of one measurement relative to another. The characteristics of the target objects 20, 22 can hence be measured with correspondingly high resolution by the use of an appropriate sensor type for the sensor 24, such as an x-ray scanning sensor. The downhole tool 12 can have a sensing window 32 to allow for the sensor to emit and receive electromagnetic waves such as x-rays without any obstruction from the tool body 14.

Figure 2:
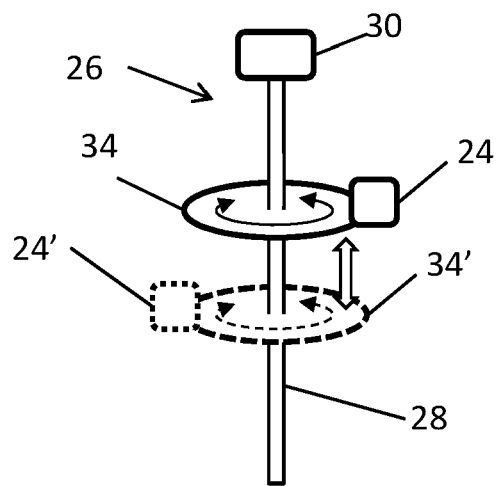
FIG. 2 shows a schematic of an arrangement allowing for sensor movement in rotation as well as in translation.

FIG. 2 shows an additional feature that could be implemented with a tool as in FIG. 1. In FIG. 2 the sensor 24 is mounted to the shaft 28 via a rotation mechanism that includes a turntable 34 in order to allow for 360 degree rotation of the sensor about the longitudinal axis of the downhole tool 14. As with the example of FIG. 1 the screw shaft 28 can be driven by a motor and potentiometer device 30. In addition, there can be a further mechanism, such as an additional motor that powers the turntable 34 for rotation relative to the screw shaft 28. Alternatively, the turntable 34 may be selectively coupled to the screw shaft 28 in one case for sliding but not rotational movement, and in the other case for rotating but not sliding movement. This allows a single motor and potentiometer device 30 to control and measure both the longitudinal and rotational movement of the sensor 24.

With an arrangement as in FIG. 2, by means of a longitudinal movement of the turntable 34 along the screw shaft 28 and a rotational movement of the turntable 34 about the screw shaft 28 then the sensor 24 can be moved to a new position as shown by the dashed sensor 24' and turntable 34'. It will be appreciated that this mechanism, and alternative actuator mechanisms with the same function, can be used to allow for measurements at various directions extending from the longitudinal axis of the tool as well as at various positions along the longitudinal axis, with the possibility for accurate control of the relative location of the sensor throughout the range of movement. Thus, accurate azimuthal as well as longitudinal variation can be achieved, enabling the use of sensors such as the x-ray scanning sensor mentioned above to provide azimuthal x-ray scanning measurements.

In another variation the turntable 34 may be replaced by a disc or another part that is fixed relative to the screw shaft 28. This fixed part can have a track about its circumference, with the sensor 24 mounted on the track in order that the sensing direction can be rotated by movement of the sensor around the circumferential track.

As will be appreciated, the exact actuator mechanism that is used could be varied, and what is important is that the sensor or at least the direction of measurement of the sensor can be both rotated and also moved longitudinally along the axis of the tool. A further possibility is for the shaft for longitudinal movement of the sensor to be held on a rotation mechanism so that the shaft itself is moved about a circumference, with the sensor moving up and down the shaft and the rotating mechanism being fixed in terms of its longitudinal position within the tool.

It will be understood that a similar sensor arrangement could be implemented in differing types of tools 12 with different tool bodies 14 and so on. For example, a similar sensor apparatus could be used for logging while drilling.

The invention claimed is:

1. A sensor apparatus for a downhole tool, the sensor apparatus comprising:
   a sensor for taking downhole measurements; and
   a sensor support for mounting the sensor to the downhole tool,
   wherein the sensor support includes an actuator for moving at least one moveable part of the sensor in a direction extending along a longitudinal axis of the downhole tool, such that in use the at least one moveable part of the sensor can move relative to the tool in a direction extending along a longitudinal axis of a borehole, wherein the actuator includes a mechanism for controlled translating movement of the at least one moveable part of the sensor in a straight line that is parallel with the longitudinal axis of the tool in order that the sensor and the actuator are arranged so that measurements can be taken for at least one of
- while the at least one moveable part of the sensor is moving, and
- with step-wise movements of the at least one moveable part of the sensor between multiple measurements, and wherein, in use, the sensor apparatus logs multiple measurements from the sensor with movement of the at least one moveable part of the sensor via the mechanism to different locations along the straight line that is parallel with the longitudinal axis during the multiple measurements and logs relative locations of the multiple measurements using a point on the tool as a reference without using an external reference point to obtain an indication of the absolute depth of the measurements.

2. The sensor apparatus as claimed in claim 1, wherein the sensor apparatus includes only a single sensor for taking downhole measurements to assess downhole conditions and logging measurements of downhole conditions.

3. The sensor apparatus as claimed in claim 1, wherein the sensor includes a transmitting part and a receiving part that are both moved by the actuator.

4. The sensor apparatus as claimed in claim 1, wherein a range of movement of the at least one moveable part of the sensor is at least 1 m in the direction extending along the longitudinal axis.

5. The sensor apparatus as claimed in claim 1, wherein the actuator includes a mechanism for rotational movement of the at least one moveable part of the sensor so that the sensor can take measurements in various directions extending outward from the longitudinal axis of the tool.

6. The sensor apparatus as claimed in claim 1, wherein the actuator includes a screw shaft with the at least one moveable part of the sensor mounted for sliding movement along the screw shaft whilst rotation of the at least one moveable part of the sensor relative to the screw shaft is restricted.

7. The sensor apparatus as claimed in claim 6, further comprising a motor for turning the screw shaft and a no-back device for restricting movement of the at least one moveable part of the sensor along the screw shaft unless the motor is turning.

8. The sensor apparatus as claimed in claim 1, wherein the actuator includes a movement detector for monitoring movement of the actuator and/or movement of the at least one moveable part of the sensor as it is propelled by the actuator.

9. The sensor apparatus as claimed in claim 1, wherein the sensor can provide a resolution that corresponds with an accuracy of movement of the at least one moveable part of the sensor by the actuator.

10. The sensor apparatus as claimed in claim 1, wherein a resolution of the sensor is 10-50 µm.

11. The sensor apparatus as claimed in claim 1, wherein the sensor is a sensor using light or ionising radiation.

12. The sensor apparatus as claimed in claim 1, wherein the sensor uses x-ray.

13. The sensor apparatus as claimed in claim 1, further comprising a sensing window for preventing an operation of the sensor from being obstructed by a body of the tool.

14. The sensor apparatus as claimed in claim 1, wherein the sensor apparatus is configured for taking measurements whilst the tool is stationary and also whilst the tool is moving, and the apparatus includes an accelerometer for monitoring movement of the at least one moveable part of the sensor and/or of the tool, and the sensor apparatus may be arranged to use the accelerometer for correction to improve results from the sensor in a case of variation in a speed of movement of the tool.

15. The downhole tool including a sensor apparatus as claimed in claim 1.

16. The downhole tool as claimed in claim 15, wherein the downhole tool is either a wireline tool or a logging while drilling (LWD) tool.

17. A method for taking downhole measurements, the method comprising using the sensor apparatus as claimed in claim 1 in a downhole tool,
wherein the using of the sensor apparatus comprises:
logging multiple measurements from the sensor;
moving the at least one moveable part of the sensor via the mechanism to different locations along the straight line that is parallel with the longitudinal axis during the multiple measurements; and
logging the relative locations of the multiple measurements using the point on the tool as a reference without using an external reference point to obtain an indication of the absolute depth of the measurements.

18. The method as claimed in claim 17, comprising using only the sensor for logging measurements of downhole conditions at depths with reference to the point on the tool without any use of other sensors to take measurements to find the distance from an external reference point.

19. A method of manufacturing or modifying a downhole tool, the method comprising installing the sensor apparatus as claimed in claim 1 on the downhole tool.

20. The method as claimed in claim 19, further comprising removing an existing sensor from a downhole tool and replacing the existing sensor with the sensor apparatus as claimed in claim 1.

* * * * *